US012651384B2

(12) United States Patent　　　　(10) Patent No.:　US 12,651,384 B2
Kotani et al.　　　　　　　　　　　　(45) Date of Patent:　　　Jun. 9, 2026

(54) GENERATING HANDWRITING VIA DECOUPLED STYLE DESCRIPTORS

(71) Applicant: Brown University, Providence, RI (US)

(72) Inventors: Atsunobu Kotani, Tokyo (JP); Stefanie Tellex, Providence, RI (US); James Tompkin, Cambridge, MA (US)

(73) Assignee: Brown University, Providence, RI (US)

( * ) Notice: Subject to any disclaimer, the term of this patent is extended or adjusted under 35 U.S.C. 154(b) by 1037 days.

(21) Appl. No.: 17/409,347

(22) Filed: Aug. 23, 2021

(65) Prior Publication Data

US 2022/0058842 A1　　Feb. 24, 2022

Related U.S. Application Data

(60) Provisional application No. 63/069,288, filed on Aug. 24, 2020.

(51) Int. Cl.
G06T 11/23　　　(2026.01)
G06N 3/08　　　(2023.01)
G06V 30/226　　(2022.01)

(52) U.S. Cl.
CPC ................ G06T 11/23 (2026.01); G06N 3/08 (2013.01); G06V 30/226 (2022.01)

(58) Field of Classification Search
CPC ........ G06T 11/203; G06N 3/08; G06N 3/044; G06N 3/045; G06N 3/047; G06N 3/088; G06V 30/226
See application file for complete search history.

(56) References Cited

U.S. PATENT DOCUMENTS

| | | | |
|---|---|---|---|
| 8,503,788 B2 | 8/2013 | Woo et al. | |
| 8,509,537 B2 | 8/2013 | Perronnin et al. | |
| 8,786,607 B2 | 7/2014 | Cho et al. | |
| 9,633,255 B2 | 4/2017 | Kumar | |
| 10,055,659 B2 | 8/2018 | Elarian | |
| 10,083,362 B2 | 9/2018 | Elarian | |
| 10,140,262 B2 | 11/2018 | Elarian | |
| 10,346,034 B2 | 7/2019 | Wang et al. | |
| 10,698,597 B2 | 6/2020 | Perrin et al. | |
| 10,733,325 B1 | 8/2020 | Goodsitt et al. | |
| 10,893,156 B1 * | 1/2021 | Moua ................. | H04N 1/00538 |
| 11,699,044 B1 * | 7/2023 | Allen ............... | G06V 30/19147 704/9 |
| 2003/0190145 A1 * | 10/2003 | Copperman ............ | G06F 16/40 |

(Continued)

FOREIGN PATENT DOCUMENTS

| | | |
|---|---|---|
| CN | 107644006 A | 1/2018 |
| CN | 111143541 A | 5/2020 |
| KR | 100856775 B1 | 9/2008 |

OTHER PUBLICATIONS

Aksan , et al., "DeepWriting: Making Digital Ink Editable via Deep Generative Modeling", CHI, Apr. 21-26, 2018, 14 pages.

(Continued)

*Primary Examiner* — Keith D Bloomquist

(74) *Attorney, Agent, or Firm* — Banner & Witcoff, Ltd.

(57)　　　　　　ABSTRACT

A method of representing a space of handwriting stroke styles includes representing writer-, character- and writer-character-level style variations within a recurrent neural network (RNN) model using decoupled style descriptors (DSD) that model the style variations such that character style variations depend on writer style.

20 Claims, 4 Drawing Sheets

(56)         References Cited

U.S. PATENT DOCUMENTS

| | | | |
|---|---|---|---|
| 2006/0193518 A1* | 8/2006 | Dong | G06V 30/2264 |
| | | | 382/186 |
| 2007/0097124 A1 | 5/2007 | Chang et al. | |
| 2007/0140562 A1* | 6/2007 | Linderman | G06V 30/1423 |
| | | | 382/187 |
| 2009/0041354 A1* | 2/2009 | Liu | G06F 18/295 |
| | | | 382/187 |
| 2013/0300675 A1* | 11/2013 | Tsutsui | G06F 3/04883 |
| | | | 345/173 |
| 2013/0343639 A1 | 12/2013 | Benko et al. | |
| 2020/0026951 A1* | 1/2020 | Chowdhury | G06T 3/40 |
| 2021/0150789 A1* | 5/2021 | Szarzynski | G06T 11/203 |
| 2021/0166013 A1* | 6/2021 | Tensmeyer | G06V 30/2276 |

OTHER PUBLICATIONS

Balreira, Dennis Giovani, "Efficient Acquisition and Synthesis in Computerized Handwriting", Thesis presented in partial fulfillment of the requirements for the degree of Doctor of Computer Science, Porto Alegre, Dec. 2019, 110 pages.
Fogel , et al., "ScrabbleGAN: Semi-Supervised Varying Length Handwritten Text Generation", IEEE/CVF Conference on Computer Vision and Pattern Recognition (CVPR), 2020, pp. 4323-4332.
Gomez , et al., "Selective Style Transfer for Text", accessed at link "arXiv:1906.01466v1 [cs.CV]", Jun. 4, 2019, 8 pages.
Graves, Alex , "Generating Sequences With Recurrent Neural Networks", accessed at link "arXiv:1308.0850v5 [cs. NE]", Jun. 5, 2014, 43 pages.
Haines , et al., "My text in your handwriting", ACM Transactions on Graphics, vol. 35, No. 3, May 2016, 29 pages.
Ji , et al., "Generative Adversarial Network for Handwritten Text", accessed at link "arXiv: 1907.11845v3 [cs.LG]", Feb. 27, 2020, 12 pages.
Kotani , et al., "Generating Handwriting via Decoupled Style Descriptors", Accessed at link "arXiv:2008.11354v2 [cs. CV]", Sep. 14, 2020, 35 pages.
Lian , et al., "EasyFont: A Style Learning-Based System to Easily Build Your Large-Scale Handwriting Fonts", ACM Transactions on Graphics, vol. 38, No. 1, Article 6., Dec. 2018, p. 6:1-6:18.
Marti , et al., "The IAM-database: An English Sentence Database for Offline Handwriting Recognition", International Journal on Document Analysis and Recognition, vol. 5, 2002, pp. 39-46.

* cited by examiner

<u>100</u>

Input: $D$: database of writer-character-DSD, $s^*$: target sentence to generate, $\overline{\mathbf{w}}$: mean global writer-DSD 1  Function PerformSamplingAlgorithm($D$, $s^*$, $\overline{\mathbf{w}}$):

2  Initialize empty sets $L$, $R$ and *result*

3  $s^* \leftarrow$ MarkAllCharactersAsUncovered($s^*$)

4  $ss^* \leftarrow$ ExtractSubStringsAndOrderByLength($s^*$)

5  for each substring $ss$ in $ss^*$ do

6  if $ss$ is in $D$ and every characters in $ss$ are not-covered then

7  $[\mathbf{w}_{c_1}, ..., \mathbf{w}_{c_q}] =$ QueryDatabaseWithKey($ss$)

8  Add $[\mathbf{w}_{c_1}, ..., \mathbf{w}_{c_q}]$ to $L$

9  $s^* \leftarrow$ MarkCharactersInSubstringAsCovered($s^*$, $ss$)

10  for each uncovered character $c_i$ in $s^*$ do

11  $\mathbf{w}_{c_i} \leftarrow \mathbf{C}_{c_i}\overline{\mathbf{w}}$

12  Add $[\mathbf{w}_{c_i}]$ to $L$

13  $L^* \leftarrow$ OrderSetBySubstringAppearanceIn($s^*$)

14  for each array $A$ in $L^*$ do

15  for each $\mathbf{w}_{c_i}$ in $A$ do

16  $\mathbf{w}_{c_i}^{rec} \leftarrow h_\theta([R_1, R_2, ..., \mathbf{w}_{c_i}])$ 17  Add $\mathbf{w}_{c_i}^{rec}$ to the *result* list 18  if $\mathbf{w}_{c_i}$ is the last element in $A$ then

19  Add $\mathbf{w}_{c_i}$ to the reference set $R$

20  return *result*

FIG. 3

GENERATING HANDWRITING VIA DECOUPLED STYLE DESCRIPTORS

CROSS REFERENCE TO RELATED APPLICATIONS

This application claims benefit from U.S. Provisional Patent Application Ser. No. 63/069,288, filed Aug. 24, 2020, which is incorporated by reference in its entirety.

STATEMENT REGARDING GOVERNMENT INTEREST

This invention was made with government support under grant number U.S. Pat. No. 1,652,561 awarded by the National Science Foundation. The government has certain rights in the invention.

BACKGROUND OF THE INVENTION

The present invention relates generally to computational models of handwriting, and specifically to generating handwriting via decoupled style descriptors.

In general, representing a space of handwriting stroke styles includes the challenge of representing both the style of each character and the overall style of the human writer. Existing Variational Recurrent Neural Network (VRNN) approaches to representing handwriting often do not distinguish between these different style components, which can reduce model capability.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In general, in one aspect, the invention features a method of representing a space of handwriting stroke styles including representing writer-, character- and writer-character-level style variations within a recurrent neural network (RNN) model using decoupled style descriptors (DSD) that model the style variations such that character style variations depend on writer style.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

These and other features, aspects, and advantages of the present invention will become better understood with reference to the following description, appended claims, and accompanying drawings where:

FIG. 3 is a flow diagram.

DETAILED DESCRIPTION

Figure 1:
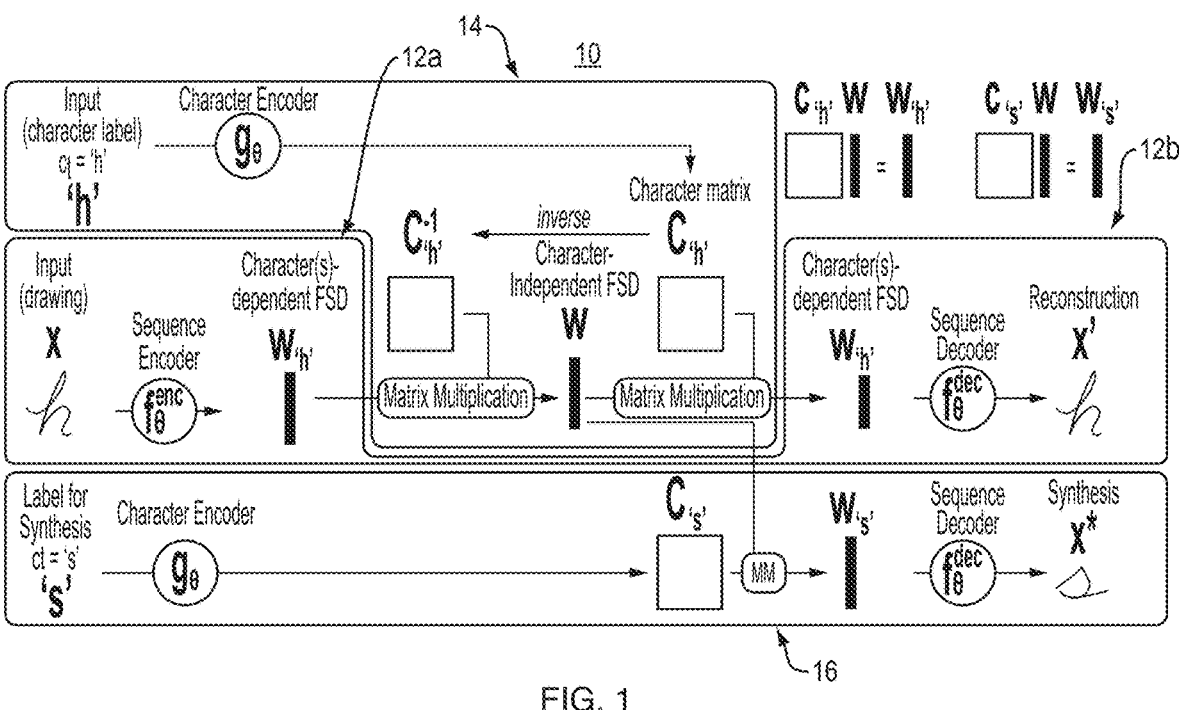
FIG. 1 is an exemplary architecture.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The present invention is a Decoupled Style Descriptor (DSD) model for handwriting, which factors both character- and writer-level styles and allows our model to represent an overall greater space of styles.

Challenges in handwriting representation include reproducing fine detail, generating unseen characters, enabling style interpolation and transfer, and using human-labeled training data efficiently. Across these, one foundational problem is how to succinctly represent both the style variation of each character and the overall style of the human writer—to capture both the variation within an 'h' letterform and the overall consistency with other letterform for each writer.

As handwriting strokes can be modeled as a sequence of points over time, supervised deep learning methods to handwriting representation can use recurrent neural networks (RNNs). This allows consistent capture of style features that are distant in time and, with the use of variational RNNs (VRNNs), allows the diverse generation of handwriting by drawing from modeled distributions.

However, the approach of treating handwriting style as a 'unified' property of a sequence can limit the representation of both character- and writer-level features. This includes specific character details being averaged out to maintain overall writer style, and a reduced representation space of writing styles.

Instead, in the present invention, we explicitly represent 1) writer-, 2) character- and 3) writer-character-level style variations within an RNN model. Our method of Decoupled Style Descriptors (DSD) models style variations such that character style can still depend on writer style. Given a database of handwriting strokes as timestamped sequences of points with character string labels, we learn a representation that encodes three key factors: writer-independent character-string representations ($C_h$ for character h, $C_{his}$ for the word his), writer-dependent character-string style descriptors ($w_h$ for character h, $w_{his}$ for the word his), and writer-dependent global style descriptors (w per writer). This allows new sequence generation for existing writers (via new $w_{she}$), new writer generation via style transfer and interpolation (via new w), and new character generation in the style of existing writers (via new $C_2$, from only a few samples of character 2 from any writer). Further, our method helps to improve generation quality as more samples are provided for projection, rather than tending towards average letterforms in existing VRNN models.

In summary, the present invention includes using Decoupled Style Descriptors as a way to represent latent style information, an architecture with DSDs to model handwriting, with demonstration applications in generation, recognition, and new character adaptation; and a database, referred to as BRUSH (BRown University Stylus Handwriting), of handwritten digital strokes in the Latin alphabet, which includes 170 writers, 86 characters, 488 common words written by all writers, and 3668 rarer words written across writers. (See http://dsd.cs.brown.edu).

In FIG. 1, an exemplary system architecture 10 is illustrated, where circles are parametrized function approximators and rectangles/squares are variables. A (Blue) region 12*a*, 12*b* represent an encoder-decoder architecture, a region 14 (Orange) represents character-conditioned layers, and a region (16) (Green) represents a synthesis procedure.

Input, preprocess, and output. A stroke sequence $x=(p_1, \ldots, p_N)$ has each $p_t$ store the change in x- and y-axis from the previous timestep ($\Delta x_t = x_t - x_t - 1$, $\Delta y_t = y_t - y_t - 1$), and a binary termination flag for the 'end of stroke' (eos={0, 1}). This creates an (N, 3) matrix. A character sequence $s=(c_1, \ldots, c_M)$ contains character vectors $c_t$ where each is a one-hot vector of length equal to the total number of characters considered. This similarly is an (M, Q) matrix.

An IAM dataset and our stroke dataset were collected by asking participants to naturally write character sequences or words, which often produces cursive writing. As such, we must solve a segmentation problem to attribute stroke points to specific characters in s. We use unsupervised learning to train a segmentation network $k_\theta(x, s)$ to map regions in x to characters, and to demark 'end of character' labels (eoc={0, 1}) for each point.

As output, we wish to predict x' comprised of $p'_t$ with 1) coefficients for Mixture Density Networks ($\pi_t$, $\mu_x$, $\mu_y$, $\sigma_x$, $\sigma_y$, $\rho$), which provide variation in output by sampling $\Delta x_t$ and $\Delta y_t$ from these distributions at runtime; 2) 'end of stroke' eos probability; and 3) 'end of character' eoc probability. This lets us generate cursive writing when eos probability is low and eoc probability is high.

Decoupled Style Descriptors (DSD). As shown in 12*a*, 12*b*, given a supervised database x, s and a target string $c_t$, to represent handwriting style we train a paencrameterized encoder function $f_\theta^{enc}$ to learn writer-dependent character-dependent latent vectors $w_{ct}$. Then, given $w_{ct}$, we simultaneously train a parameterized decoder function $f_\theta^{dec}$ to predict the next point $p'_t$ given all past points $p'_{1:t-1}$. Both encoder and decoder $f_\theta$ are RNNs such as LSTM models:

$$p'_t = f_\theta^{dec}(p'_{1:t-1} \mid w_{ct}). \tag{1}$$

This method does not factor character-independent writer style; yet, we have no way of explicitly describing this property via supervision and so we must devise a construction to learn it implicitly. Thus, we add a layer of abstraction region 14 with three assumptions:

1. If two stroke sequences $x_1$ and $x_2$ are written by the same writer, then consistency in their writing style is manifested by a character-independent writer-dependent latent vector w.

2. If two character sequences $s_1$ and $s_2$ are written by different writers, then consistency in their stroke sequences is manifested by a character-dependent writer-independent latent matrix C. C can be estimated via a parameterized encoder function $g_\theta$, which is also an RNN such as an LSTM:

$$C_{ct} = g_\theta(s, c_t) \tag{2}$$

3. $C_{ct}$ instantiates a writer's style w to draw a character via $w_{ct}$, such that $C_{ct}$ and w are latent factors:

$$w_{ct} = C_{ct}w, \tag{3}$$

$$w = C_{ct}^{-1}w_{ct}. \tag{4}$$

This method assumes that $C_{ct}$. Intuitively, the multiplication of writer-dependent character vectors $w_{ct}$ with the inverse of character-DSD $C_{ct}^{-1}$ (Eq. 4) factors out character-dependent information from writer-dependent information in $w_{ct}$ to extract a writer style representation w. Likewise, Eq. 3 restores writer-dependent character $w_{ct}$ by multiplying the writer-specific style w with a relevant character-DSD $C_{ct}$.

We use this property in synthesis (FIG. 1, region 16). Given a target character $c_t$, we use encoder $g_\theta$ to generate a C matrix. Then, we multiply $C_{ct}$ by a desired writer style w to generate $w_{ct}$. Finally, we use trained decoder $f_\theta^{dec}$ to create a new point $p'_t$ given previous points $p'_{1:t-1}$:

$$p'_t = f_\theta^{dec}(p'_{1:t-1} \mid w_{ct}), \text{ where } w_{ct} = C_{ct}w. \tag{5}$$

Interpreting the linear factors. Eq. 3 states a linear relationship between $C_{ct}$ and w. This exists at the latent representation level: $w_{ct}$ and $C_{ct}$ are separately approximated by independent neural networks $f_\theta^{enc}$ and $g_\theta$, which themselves are nonlinear function approximators. As $C_{ct}$ maps a vector w to another vector Wet, we can consider $C_{ct}$ to be a fully-connected neural network layer (without bias). However, unlike standard layers, $C_{ct}$'s weights are not implicitly learned through backpropagation but are predicted by a neural network $g_\theta$ in Eq. 2. A further interpretation of $C_{ct}$ and $C_{ct}^{-1}$ as two layers of a network is that they respectively share a set of weights and their inverse. Explicitly forming $C_{ct}$ in this linear way makes it simple to estimate $C_{ct}$ for new characters that are not in the training dataset, given few sample pairs of $w_{ct}$ and w, using standard linear least squares methods.

Mapping character and stroke sequences with $f_\theta$ and $g_\theta$. Next, we turn our attention to how we map sequences of characters and strokes within our function approximators. Consider the LSTM $f_\theta^{enc}$: Given a character sequence s as size of (M, Q) where M is the number of characters, and a stroke sequence x of size (N, 3) where N is the number of points, our goal is to obtain a style vector for each character wct in that sequence. The output of our segmentation network $k_\theta$ preprocess defines 'end of character' bits, and so we know at which point in x that a character switch occurs, e.g., from h to e in hello.

Figure 2:
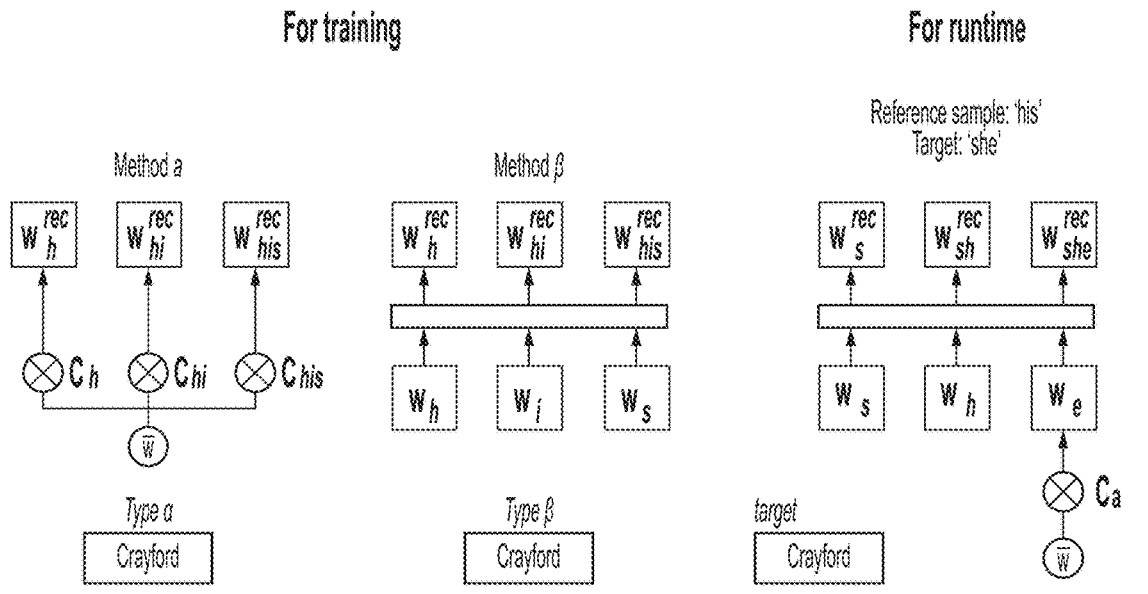
FIG. 2 illustrates exemplary reconstruction methods.

First, we encode x using $f_\theta^{enc}$ to obtain a x* of size (N, L), where L is the latent feature dimension size (we use 256). Then, from x*, we extract M vectors at these switch indices—these are our writer-dependent character-dependent DSDS $w_{ct}$. As $f_\theta$ enc is an LSTM, the historical sequence data up to that index is encoded within the vector at that index (FIG. 2, top). For instance, for his, x* at switch index 2 represents how the writer writes the first two characters hi, i.e., $w_{hi}$. We refer to these $w_{ct}$ as 'writer-character-DSDs'.

Likewise, LSTM $g_\theta$ takes a character sequence s of size (M, Q) and outputs an array of C matrices that forms a tensor of size (M, L, L) and preserves sequential dependencies between characters: The i-th element of the tensor $C_{ci}$ is a matrix of size (L, L)—that is, it includes information about previous characters up to and including the i-th character. Similar to x*, for his, the second character matrix $C_{c2}$ contains information about the first two characters hi—C is really a character sequence matrix. Multiplying character information $C_{ct}$ with writer style vector w creates a writer-character-DSD $w_{ct}$.

Estimating w. When we encode a stroke sequence x that draws s characters via $f_\theta^{enc}$, we extract M character(s)-dependent DSDS $w_{ct}$ (e.g., $w_h$, $w_{hi}$ and $w_{his}$, right). Via Eq. 4, we obtain M distinct candidates for writer-DSDs w. To overcome this, for each sample, we simply take the mean to form w:

$$\overline{w} = \frac{1}{M}\sum_{t=1}^{M} C_{c_t}^{-1} w_{c_t}. \qquad (6)$$

Generation approaches via $w_{ct}$. Consider a synthesis task: given our trained model, generate how a new writer would write she given a reference sample of them writing his. From the his sample, we can extract 1) segment-level writer-character-DSDs ($w_h$, $w_i$, $w_s$), and 2) the global w. To synthesize she, our model must predict three writer-character-DSDs ($w_s$, $w_{sh}$, $w_{she}$) as input to the decoder $f_\theta^{enc}$. We introduce two methods to estimate $w_{ct}$:

Method $\alpha$: $w_{c_t}^{\alpha} = C_{c_t}\overline{w}$ $\qquad (7a)$

Method $\beta$: $w_{c_t}^{\beta} = h_\theta([w_{c_1}, \dots , w_{c_t}])$ $\qquad (7b)$ where $h_\theta$ is an LSTM that restore dependencies between temporally-separated writer-character-DSDs as illustrated in FIG. 2. We train our model to reconstruct $w_{ct}$ both ways. This allows us to use method $\alpha$ when test reference samples do not include target characters, e.g., his is missing an e for she, and so we can reconstruct $w_e$ via w and $C_e$ (FIG. 2, right). It also allows us to use Method $\beta$ when test reference samples include relevant characters that via $f_\theta^{enc}$, provide writer-character-DSDs, e.g., his contains s and h in she and so we can estimate $w_s$ and $w_h$. As these characters could come from any place in the reference samples, $h_\theta$ restores the missing sequence dependencies.

Decoupling additional styles. Our model can scale to more styles. For instance, we can create an writer age matrix A from a numerical age value $\alpha$ as C is constructed from $c_t$, and extract character-independent age-independent style descriptor as $w^* = A^{-1}C_{ct}^{-1} w_{ct}$. Introducing a new age operator A invites our model to find latent-style similarities across different age categories (e.g., between a child and a mature writer). Changing the age value and thus A may predict how a child's handwriting changes as s/he becomes older.

Alternatives to linear C multiplication operator. Our model can generate new characters by approximating a new C matrix from few pairs of w and wat thanks to their linear relationship. However, one might consider replacing our matrix multiplication 'operator' on C with parametrized nonlinear function approximators, such as autoencoders. Multiplication by $C^{-1}$ would become an encoder, with multiplication by C being a decoder; in this way, $g_\theta$ would be tasked with predicting encoder weights given some pre-defined architecture. Here, consistency with w must still be retained.

Sampling Method for Writer-Character-DSD $w_{ct}$

When handwriting samples x with corresponding character strings s are provided for inference, we can extract writer-character-DSDS $w_{ct}$ from x for substrings of s. For example, for character string his, we can first extract the following 3 arrays of write character-DSDs using $f_\theta^{enc}$:[$w_h$], [$w_h$, $w_{hi}$], and [$w_h$, $w_{hi}$, $w_{his}$]. In addition, if the handwriting is non-cursive and each character is properly segmented, then we can also obtain 3 more ([$w_i$], [$w_i$, $w_{is}$], and [$w_s$]). However, we must ensure that the handwriting is cursive, as h, i, and s could be connected by a single stroke. In such cases, we only extract the first 3 arrays.

We create a database D of these arrays of writer-character-DSDs with sub-strings as their keys, and query substrings in the target sentence s* for generation to obtain relevant writer character-DSDs. We also compute the mean global writer-DSD w as $$\overline{w} = \frac{1}{N}\sum_{c_t} C_{c_t}^{-1} w_{c_t}$$

where N is the number of obtained $w_{ct}$.

To synthesize a sample thin from his, we query the substring hi and receive an array of DSDs: [$w_h$, $w_{hi}$]. As $w_t$ and $w_n$ are computed from w:

$w_t^{rec} = h_\theta([w_t])$ $\qquad (14a)$ $w_{th}^{rec} = h_\theta([w_t, w_h])$ $\qquad (14b)$ $w_{thi}^{rec} = h_\theta([w_t, w_{hi}])$ $\qquad (14c)$ $w_{thin}^{rec} = h_\theta([w_t, w_{hi}, w_n])$ $\qquad (14d)$ We use [$w_t$, $w_t$] instead of [$w_t$, $w_h$, $w_{hi}$] in Equations 14c and 14d because, as one might recall from generation Method B, the function approximator $h_\theta$ is designed to restore temporal dependencies between writer-character-DSDs. As 'h' and 'i' are already temporally dependent within $w_{hi}$, we need only connect characters 't' and 'h' through LSTM $h_\theta$. The pseudocode for this sampling procedure is shown in process 100, with example generations in FIG. 3.

Sequence Decoder $f_\theta^{dec}$

Figure 4:
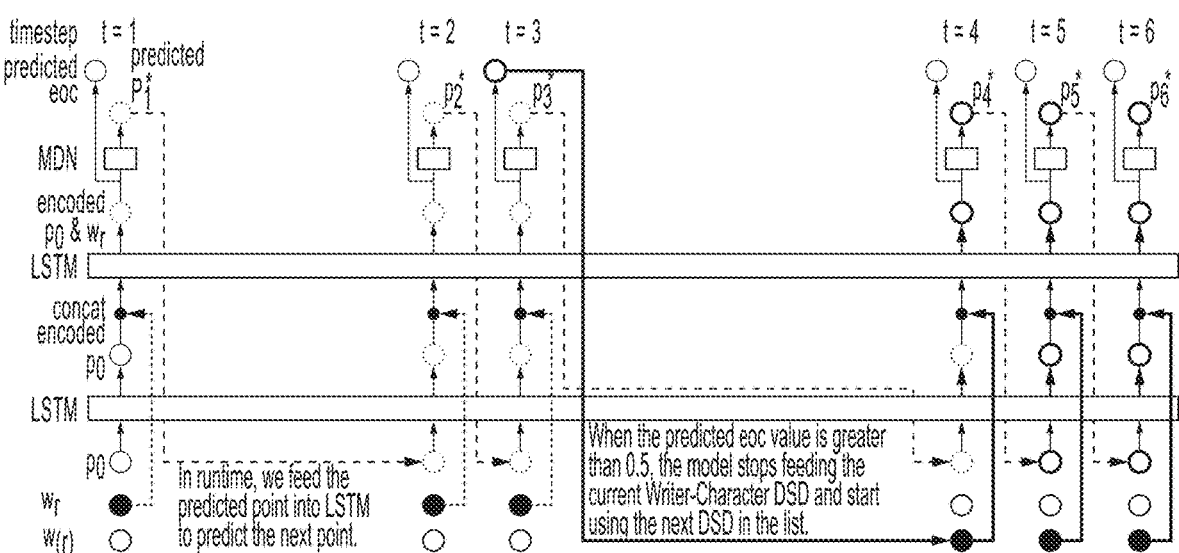
FIG. 4 is an exemplary decoder architecture.

To synthesize a new sample from a list of writer-character-DSD $w_{ct}$, we train a sequence decoder function $f_\theta^{enc}$. The inputs to this decoder are: 1) initial point p 0=(0, 0, 0), and 2) the first writer-character-DSD $w_{c1}$. Continuing with the thin example, we predict the first point $p_1$ from $p_\theta$ and $w_t$. At runtime, the predicted point $p_1$* will be fed into the LSTM at the next timestep to predict $p_2$. When the decoder model outputs an eoc>0.5 (end-of-character probability), the model stops drawing the current character and start referencing the next writer-character-DSD so that it starts drawing the next character. This procedure is illustrated as the red lines in FIG. 4. Similarly, to determine the touch/untouch status of the pen to the canvas, we use the eos (end-of-stroke probability) which is enclosed in point prediction $p_t$*. If eos$_t$>0.5, our model lifts up the pen; if eos$_t$≤0.5, our model continues the stroke.

Note that when we use the predicted $p_t$* as an input to the LSTM at runtime, we binarize the eos value. This is because all eos values in training data are binarized. Further, we do not use the predicted points to predict the next point during training, because we have the true point sequence x. In other words:

$p_{t+1}^* = f_\theta^{dec}(p_0, p_1, \dots , p_t \mid w_{c_t})$ (training) $\qquad (15a)$ $p_{t+1}^* = f_\theta^{dec}(p_0, p_1^*, \dots , p_t^* \mid w_{c_t})$ (runtime) $\qquad (15b)$ where * indicates predicted outputs by the decoder network.

7

Figure 5:
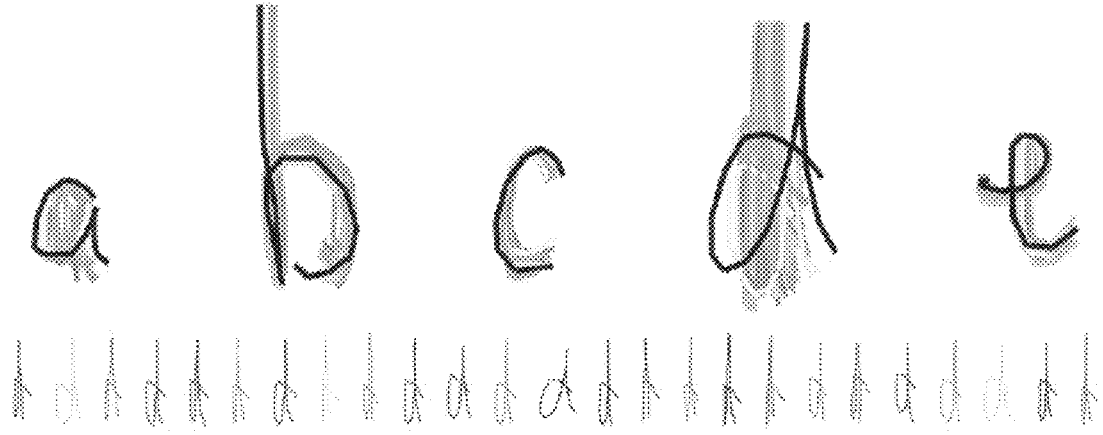
FIG. 5 illustrates exemplary variations in generated results.

Finally, the mixture density networks (MDN) layer in our decoder makes it possible for our model to generate varying samples even from the same writer-character-DSD $w_{ct}$. Examples are shown in FIG. 5.

Character Encoder Function $g_\theta$

Here we discuss in detail how the character matrix C is computed. First, we convert each one-hot character vector ct in the sentence s into a 256 dimensional vector $c_t^{RAW}$ via a fully-connected layer $g_\theta^{FC1}$. Then, we feed this vector into LSTM $g_\theta^{LSTM}$ and receive outputs $c_{ct}^{RAW}$ of the same size. $g_\theta^{LSTM}$ is designed to encode temporal dependencies among characters. Then, we use a mapping function $g_\theta^{FC2}$ to transform the 256×1 vector into a 65, 536 dimensional vector, and finally reshape the output vector to a 256×256 matrix $c_{ct}$. This process is as follows:

$$c_t^{raw} = g_\theta^{FC1}(c_t) \tag{16a}$$

$$c_{c_t}^{raw} = g_\theta^{LSTM}([c_1^{raw}, \dots, c_t^{raw}]) \tag{16b}$$

$$C_{c_t} = \text{Reshape}(g_\theta^{FC2}(c_{c_t}^{raw})) \tag{16c}$$

The parameters in $g_\theta^{FC2}$ take up about one third of total number of parameters in our model; this is expensive. However, using a fully-connected layer allows each value in the output $c_{ct}$ to be computed from all values in the 256-raw dimensional vector $c_{ct}^{RAW}$. If each value in $c_{ct}$ represents some different information about the character, then we intended to weight them 65, 536 times via distinct mapping functions to create a matrix $c_{ct}$.

Figure 6:
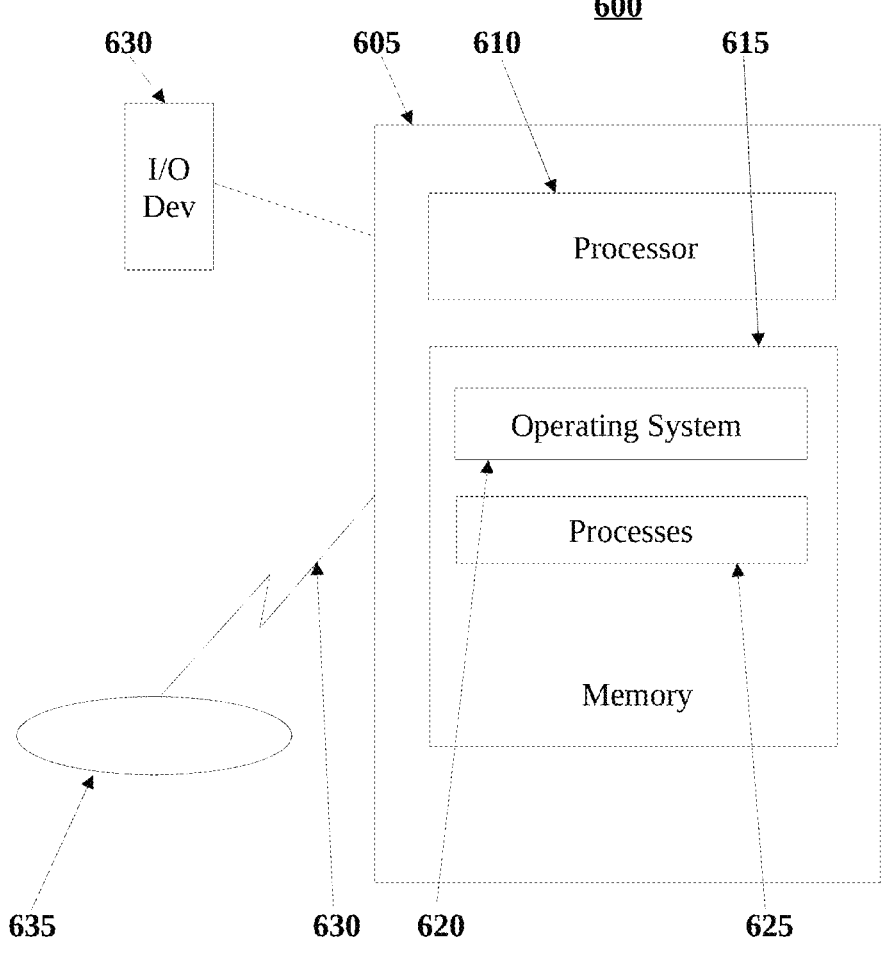
FIG. 6 illustrates an exemplary system.

Methods described above are implemented using one or more computing systems. In FIG. 6, an exemplary computing system 600 includes a computer 605. The computer 605 can include a processor 610 and a memory 615. The memory 615 can include an operating system 620, such as Linux™ or windows™, and one or more processes 625 to execute the methods described herein. The computer may also include an input/output device 630. In some implementations, the computer 605 includes a link 630 to one or more networks 635 of interconnected computers. The link 630 may be wired or wireless.

It would be appreciated by those skilled in the art that various changes and modifications can be made to the illustrated embodiments without departing from the spirit of the present invention. All such modifications and changes are intended to be within the scope of the present invention except as limited by the scope of the appended claims.

What is claimed is:

1. A method of representing a space of handwriting stroke styles of a writer, the method comprising:
representing writer-, character- and writer-character-level style variations within a recurrent neural network (RNN) model using decoupled style descriptors (DSD) that model the style variations such that character style variations depend on writer style by:
receiving one or more stroke sequences comprising a plurality of timestamped points;
generating, for the writer, a stroke dataset by assigning each of the one or more stroke sequences to a character of a plurality of characters; and
learning, based on the stroke dataset, a representation that encodes writer-independent character representations, writer-dependent character-string style descriptors, and writer-dependent global style descriptors.

2. The method of claim 1, further comprising:
generating, based on the representation, a new sequence of strokes corresponding to a new character different from the plurality of characters.

3. The method of claim 1, further comprising:
generating, based on the representation and via style transfer and interpolation, output representing one or more characters written by a second writer different from the writer.

4. The method of claim 1, wherein the learning the representation comprises learning the representation for a plurality of writers, the method further comprising:
generating, based on the representation, output representing one or more characters written in a style based on at least two of the plurality of writers.

5. The method of claim 1, wherein the one or more stroke sequences correspond to hand-written digital strokes in a Latin alphabet.

6. The method of claim 1, wherein the one or more stroke sequences further comprise, for each timestamped point of the plurality of timestamped points, an indication of whether a given point is an end of a corresponding stroke.

7. The method of claim 1, wherein the decoupled style descriptors comprise:
a character-dependent and writer-independent latent matrix; and
a writer style vector that, when multiplied by the latent matrix, causes output of a writer-dependent character-dependent latent vector.

8. A method comprising:
receiving one or more stroke sequences comprising, for each of a plurality of timesteps, a representation of a difference in spatial location, wherein each of the one or more stroke sequences correspond to written input of a writer;
generating, for a writer, a stroke dataset by assigning each of the one or more stroke sequences to a character of a first plurality of characters from the written input;
training, using the stroke dataset, a recurrent neural network for an encoder function to learn:
writer-independent character representations,
writer-dependent character-string style descriptors, and
writer-dependent global style descriptors; and
using the trained recurrent neural network to generate a second plurality of characters, wherein at least one character of the second plurality of characters is different from all characters of the first plurality of characters.

9. The method of claim 8, wherein the second plurality of characters is configured to emulate writing of a second writer different from the writer.

10. The method of claim 8, wherein the training the recurrent neural network further comprises training the recurrent neural network using a plurality of stroke datasets corresponding to a plurality of different writers.

11. The method of claim 8, wherein the one or more stroke sequences correspond to hand-written digital strokes in a Latin alphabet.

12. The method of claim 8, wherein the one or more stroke sequences further comprise, for each timestamped point of the plurality of timestamped points, an indication of whether a given point is an end of a corresponding stroke.

13. The method of claim 8, wherein the training the recurrent neural network comprises determining:
a character-dependent and writer-independent latent matrix; and a writer style vector that, when multiplied by the latent matrix, causes output of a writer-dependent character-dependent latent vector.

14. The method of claim 8, further comprising:

training, using the stroke dataset, a second recurrent neural network for a decoder function to predict, based on an input point, a next point.

15. A method comprising:

receiving one or more stroke sequences comprising, for each of a plurality of timesteps, a representation of a difference in spatial location, wherein each of the one or more stroke sequences correspond to written input of a writer;

generating, for a first writer, a stroke dataset by assigning each of the one or more stroke sequences to a character of a first plurality of characters from the written input;

training, using the stroke dataset, a recurrent neural network for an encoder function to learn:

writer-independent character representations, writer-dependent character-string style descriptors, and writer-dependent global style descriptors; and using the trained recurrent neural network to generate a second plurality of characters emulating writing of a second writer different from the first writer.

16. The method of claim 15, wherein at least one character of the second plurality of characters is different from all characters of the first plurality of characters.

17. The method of claim 15, wherein the training the recurrent neural network further comprises training the recurrent neural network using a plurality of stroke datasets corresponding to a plurality of different writers.

18. The method of claim 15, wherein the one or more stroke sequences correspond to hand-written digital strokes in a Latin alphabet.

19. The method of claim 15, wherein the one or more stroke sequences further comprise, for each timestamped point of the plurality of timestamped points, an indication of whether a given point is an end of a corresponding stroke.

20. The method of claim 15, wherein the training the recurrent neural network comprises determining:

a character-dependent and writer-independent latent matrix; and a writer style vector that, when multiplied by the latent matrix, causes output of a writer-dependent character-dependent latent vector.

* * * * *